United States Patent [19]
Foster

[11] Patent Number: 5,828,369
[45] Date of Patent: Oct. 27, 1998

[54] METHOD AND SYSTEM FOR DISPLAYING AN ANIMATION SEQUENCE FOR IN A FRAMELESS ANIMATION WINDOW ON A COMPUTER DISPLAY

[75] Inventor: Brett Foster, Almonte, Canada

[73] Assignee: Comprehend Technology Inc., New York, N.Y.

[21] Appl. No.: 573,118

[22] Filed: Dec. 15, 1995

[51] Int. Cl.$^6$ .................................................. G06T 13/00
[52] U.S. Cl. ........................................ 345/302; 345/435
[58] Field of Search .................................... 395/173, 174, 395/175, 135, 806, 807; 345/473–5, 302, 435

[56] References Cited

U.S. PATENT DOCUMENTS

| | | | |
|---|---|---|---|
| 4,116,444 | 9/1978 | Mayer et al. | 273/101.2 |
| 4,324,401 | 4/1982 | Stubben et al. | 273/85 G |
| 4,689,616 | 8/1987 | Goude et al. | 340/725 |
| 4,692,757 | 8/1987 | Tsuhara et al. | 340/721 |
| 4,918,435 | 4/1990 | Ryouki et al. | 340/747 |
| 4,947,257 | 8/1990 | Fernandez et al. | 358/183 |
| 4,965,670 | 10/1990 | Klinefelter | 358/183 |
| 4,987,551 | 1/1991 | Garrett | 364/521 |
| 5,125,671 | 6/1992 | Ueda et al. | 273/437 |
| 5,150,312 | 9/1992 | Beitel et al. | 395/118 |
| 5,280,577 | 1/1994 | Trevett et al. | 395/150 |
| 5,287,446 | 2/1994 | Williams et al. | 395/152 |
| 5,353,392 | 10/1994 | Luquet et al. | 395/135 |
| 5,444,836 | 8/1995 | Hollingsworth et al. | 395/135 |
| 5,515,485 | 5/1996 | Luquet et al. | 395/135 |
| 5,600,767 | 2/1997 | Kakiyama et al. | 395/135 |
| 5,657,462 | 8/1997 | Brouwer et al. | 345/302 |

FOREIGN PATENT DOCUMENTS

| | | | |
|---|---|---|---|
| 0 259 827 A2 | 3/1988 | European Pat. Off. | G09G 5/40 |
| 2-247693 | 10/1990 | Japan | G09G 5/40 |
| 4-161988 | 6/1992 | Japan | G09G 5/40 |
| 5-181454 | 7/1993 | Japan | G09G 5/40 |
| WO 82/01614 | 5/1982 | WIPO . | |

OTHER PUBLICATIONS

CorelDraw, Corel corporation, pp. 411–502, 1993.

Authorware Professional, Macromedia, pp. 36–41, 89–91, 1992.

Weitzman et al., Automatic Presentation of Multimedia Documents Using Relational Grammars, Proc. ACM Multimedia '94, pp. 443–451, 1994.

*Primary Examiner*—Joseph R. Burwell
*Assistant Examiner*—Jae-Hee Choi
*Attorney, Agent, or Firm*—Cohen, Pontani, Lieberman & Pavane

[57] ABSTRACT

A computer animation display system and process for smoothly displaying information containing text and moving picture images is disclosed in which animations are played back smoothly by localizing the area of moving picture display so as to reduce the memory space required on a CD-ROM (Compact Disk Read Only Memory) and allow a greater number of animation frames to be stored on a single CD-ROM. The computer animation display process plays animations on a background bitmap relative to arbitrary screen elements called anchors. The computer animation display process further provides dynamic positioning of animation during playback to maintain alignment between the animation and its corresponding anchor should the anchor's position change. The computer animation display process also provides for dynamic display of independent, separately stored text during animation playback. Modification of the text alone, without the need to modify the underlying animated graphics, is also provided.

17 Claims, 10 Drawing Sheets

MOVIE RECORD DATA

| MOVIE ID | TOPIC ID | MOVIE NAME | MOVIE BACKGROUND |
|---|---|---|---|
| 40 | 55 | 1201_N.AVI | |
| 41 | 52 | 1101_U.AVI | |
| 47 | 57 | 1301_N.AVI | BKGRND01.BMP |
| 71 | 95 | 1409_N.AVI | DSKTOP01.BMP |

(27 groups rows 40, 41, 47, 71)

*FIG. 8*

FRAME RECORD DATA

| FRAME ID | MOVIE ID | FRAME NUMBER | FRAME X | FRAME Y | FRAME ANCHOR |
|---|---|---|---|---|---|
| 102 | 40 | 140 | -150 | -140 | TASKBAR |
| 103 | 40 | 315 | 0 | 0 | CENTER |
| 104 | 40 | 442 | 0 | -140 | START BUTTON |
| 105 | 40 | 471 | 0 | -224 | START BUTTON |
| 106 | 40 | 684 | -15 | 0 | MY COMPUTER |

CALLOUT RECORD DATA

| CALLOUT ID | MOVIE ID | CALLOUT START FRAME | CALLOUT END FRAME | CALLOUT X | CALLOUT Y | CALLOUT TEXT | CALLOUT FORECOLOR |
|---|---|---|---|---|---|---|---|
| 1716 | 40 | 1 | 70 | -1 | 80 | LOOKING AT THE DESKTOP | 16777215 |
| 284 | 40 | 214 | 311 | 9 | 31 | TASKBAR | 16777215 |
| 285 | 40 | 369 | 435 | 77 | 22 | WORD PROCESSORS | 16777215 |
| 286 | 40 | 375 | 435 | 77 | 85 | SPREADSHEETS | 16777215 |
| 287 | 40 | 387 | 435 | 77 | 162 | ENCYCLOPEDIAS | 16777215 |

| CALLOUT FONTSIZE | CALLOUT FONTBOLD | CALLOUT FONTITALIC | CALLOUT BOXED | CALLOUT FONTNAME | CALLOUT FONTOVER |
|---|---|---|---|---|---|
| 20 | TRUE | FALSE | FALSE | ARIAL | TRUE |
| 16 | TRUE | FALSE | TRUE | ARIAL | TRUE |
| 12 | TRUE | FALSE | FALSE | ARIAL | TRUE |
| 12 | TRUE | FALSE | FALSE | ARIAL | TRUE |
| 12 | TRUE | FALSE | FALSE | ARIAL | TRUE |

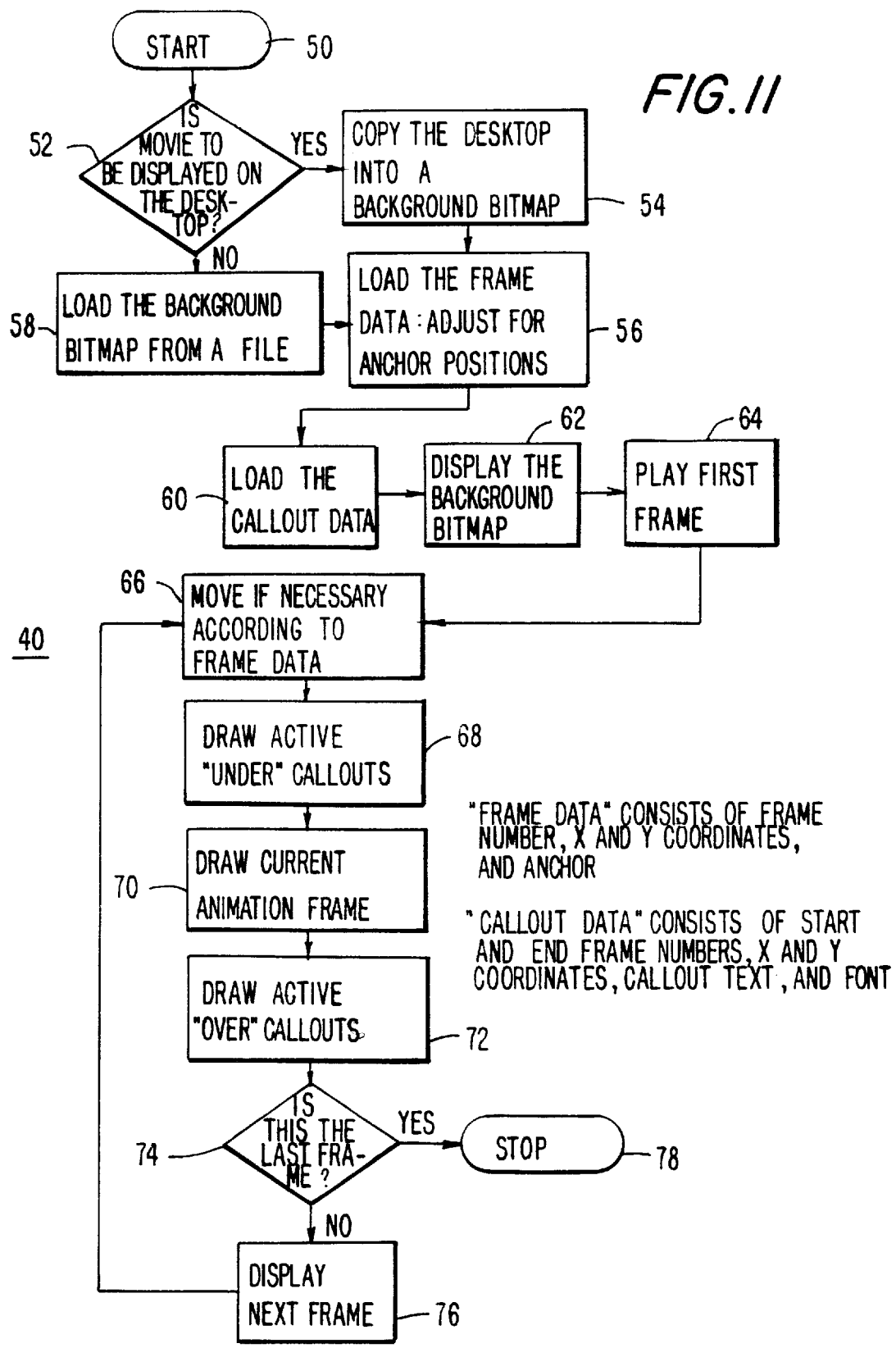

METHOD AND SYSTEM FOR DISPLAYING AN ANIMATION SEQUENCE FOR IN A FRAMELESS ANIMATION WINDOW ON A COMPUTER DISPLAY

FIELD OF THE INVENTION

This invention relates generally to the computer animation arts and the display of multimedia images and text, particularly to a method and system for creating and displaying computer animation containing independently sized and located animation and/or integrated text.

BACKGROUND OF THE INVENTION

The growth of multimedia applications has presented a need in the computer art for computer animation which contain graphic animation and which may also contain text overlays (hereinafter generally referred to as "movies"). As used herein movies is meant to refer not solely to animation with or without text, but to any visible information displayable on a computer display, such as images, numbers, shapes, colors, etc. Typical uses for these movies include tutorials, educational software, games, help files and the myriad other uses to which application software is generally applied.

Current techniques for developing computer animation permit a movie author to create separate text and animated graphic components but do not permit, as the present invention does, the separate storage of these components in memory storage devices. Rather, in the prior art the final movie is stored as an integrated whole, generally as a single file on a CD-ROM (Compact Disk Read Only Memory). Known techniques allow the creation of multi-layered movies in much the same way movie film overlays are achieved using a blue screen, i.e. separate overlays are created for text and animated graphics, which are then inseparably integrated into the final product. Prior art techniques also allow the animated portions of a movie to be confined to relatively small areas, i.e. to localize the animation to a predefined animation window which is smaller than the size of the display screen. Techniques are also currently known which allow animations to be played on top of an arbitrary background, i.e. animation playback on top of an existing screen such as, for example, a Microsoft® Windows desktop.

Problems associated with the currently known and used techniques include: (i) the inability to dynamically re-position the animation window with respect to key screen elements during playback of the movie; and (ii) the inability to modify text embedded within the multimedia movie without having to edit, i.e. re-animate, the entire movie.

Accordingly, prior art techniques produce computer animation which consume a significant amount of mass media storage due to the large storage requirements of the animated portion of the movie. In addition, the prior art "whole screen" technique negatively affects the quality of the movie, because it is known that animation plays more smoothly when displayed in a smaller area. Furthermore, because the animation window is sized for the entire display screen, presently known techniques do not permit dynamic repositioning of a less than full screen sized animation window during playback. Finally, editing the entire movie when only text changes are required is both time consuming and costly, generally requiring the movie author to make substantial changes to the application and ultimately requiring the end user to replace the CD-ROM application completely.

The present invention is directed at overcoming the aforementioned shortcomings.

SUMMARY OF THE INVENTION

The present invention provides a system and method for creating and displaying computer animation consisting of animated graphics and/or combined text or other displayable information. The invention provides a system and method for creating and displaying animated graphics in a screen display region, e.g. an animation window, that can be positioned anywhere on the display screen just prior to movie playback and dynamically repositioned while the movie is playing. Furthermore, the present invention permits an author to edit the movie text portion without having to edit the non-text movie graphics and re-animate the entire movie. As used herein the terms animation window and window mean any definable region on the display where animation or information may be displayed. That region may be the same size as the animation frame or larger.

The system, which comprises a general purpose digital computer, typically includes a display device such as a cathode ray tube (CRT) screen whereon the movie is visibly displayed. The system further includes a display control device coupled to the display device, typically a central processing unit (CPU) of a type capable of running multimedia application software, the display control device further including a plurality of high capacity data storage memory devices, typically a CD-ROM disk drive or drives, a fixed hard disk drive or drives, random access memory (RAM), and read only memory (ROM). The system also includes an ASCII-type keyboard and mouse or other similar cursor control device. Connection between these various well known components of the system is well within the scope of knowledge of those of ordinary skill in the art, and will not be discussed in detail herein.

The method includes steps for creating separate text and animated graphics for a computer animation. The method further includes steps for storing the separate text and animated graphics to a plurality of memory devices or to separate locations of a single memory device. The method also includes steps for localizing the animated graphics to an animation window, the window being dimensionally smaller than the display device screen. The method further includes steps for displaying the movie on either a pre-existing background bitmap stored in a memory device or a background bitmap currently being displayed on the display device. The method further includes steps for dynamically positioning the animation window on the display device screen at various locations during playback of the movie. The method also includes steps for editing the text of the movie without having to edit the animated graphics. The method also includes steps for retrieving the separate text and graphics from the memory storage device or devices, combining the text and graphics, and displaying the combination on the display device.

Other features of the present invention will become apparent from the following detailed description considered in conjunction with the accompanying drawings. It is to be understood, however, that the drawings are designed solely for purposes of illustration, are not to scale, and are not to be used as a definition of the limits of the invention, for which reference should be made to the appended claims.

DESCRIPTION OF THE DRAWINGS

In the drawings, which are illustrative and not to scale, and wherein like reference numerals denote like elements throughout the several views:

FIG. 8 shows exemplary data contained in a movie record;

FIG. 9 shows exemplary data contained in a frame record;

FIG. 10 shows exemplary data contained in a callout record; and

FIG. 11 is a flowchart depicting steps followed by a movie program in accordance with the instant invention.

DESCRIPTION OF THE PREFERRED EMBODIMENT

Figure 1:
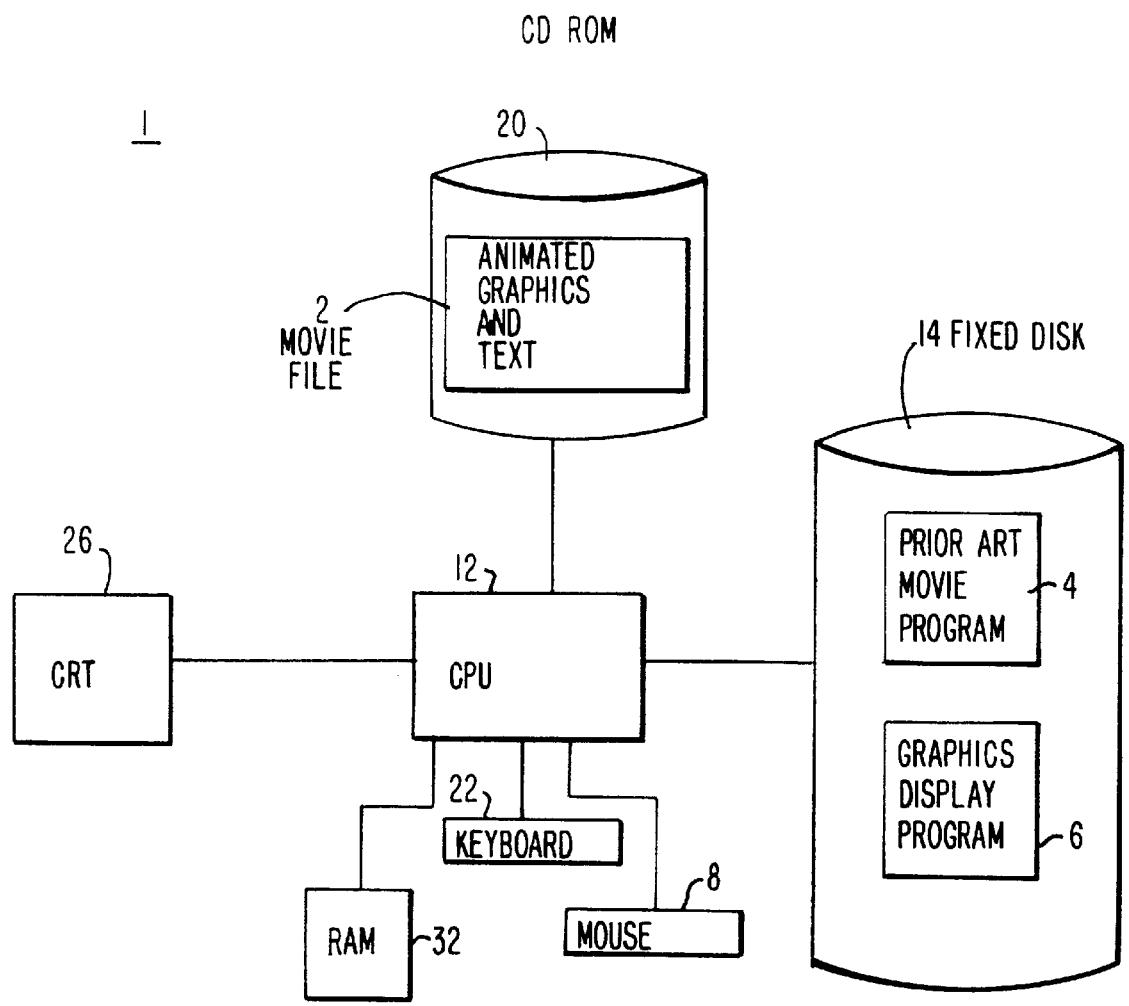
FIG. 1 is a diagrammatic representation of a general purpose digital computer with multimedia display capabilities of a type known in the prior art.

FIG. 1 depicts a computer system of the prior art in which a computer animation containing animation and text is stored in fixed form on a CD-ROM 20. The animation and text are stored as inseparable components of a movie file 2 on CD-ROM 20. A program 6 controlling the "playing" of the movie is generally stored on fixed disk 14 and run on CPU 12. The CPU executes the program 6, and in association with other well known video components—such as video RAM, display controller, etc. (not shown)—the animation and any associated text from file 2 on CD-ROM 20 are displayed as a coherent, continuously running movie on CRT 26. Any modification to the movie's text portion contained in file 2 requires re-animation of file 2 and the creation of a new CD-ROM, with its attendant difficulty and expense, not to mention inconvenience to the author and to the end user. Additionally, animation created on such a prior art system is generally created for a full screen and can not be dynamically repositioned relative to arbitrary screen elements without the aforementioned modification to the file 2 and re-creation of the CD-ROM 20.

Figure 2:
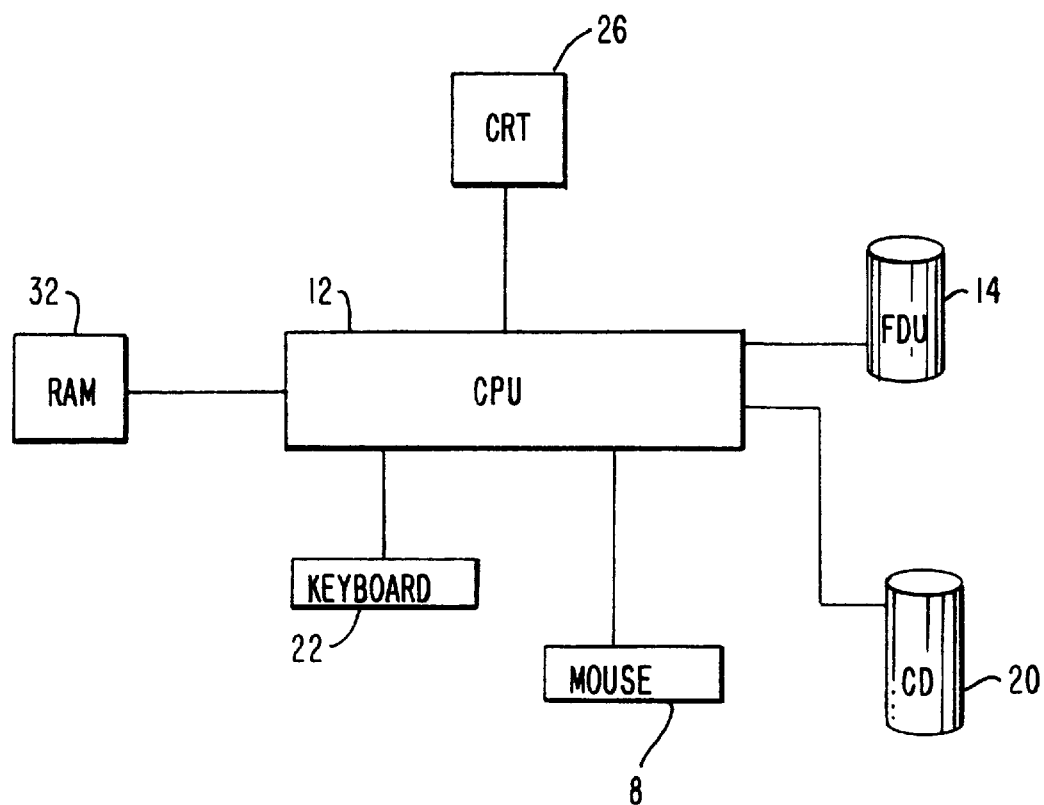
FIG. 2 is a diagrammatic representation of a preferred embodiment of a general purpose digital computer in accordance with the instant invention capable of creating and displaying computer animation.

Referring now to FIG. 2, a diagrammatic representation of a multimedia display system in accordance with the invention is generally designated at 10. The system 10 is capable of displaying a computer animation comprised of both text and animated graphics.

The preferred embodiment of the computer system 10 employs a CPU 12, such as, by way of non-limiting example an Intel 80486 CPU operating at 33 Mhz clock speed, its art recognized equivalent, or better. The computer 10 preferably includes a fixed disk drive (FDU) 14, a CD-ROM drive capable of reading data from a CD-ROM 20, and 8 or more of RAM 32, each of these components being readily available off-the-shelf computer items compatible with the computer 10. The computer 10 utilizes a multi-media-capable operating system and graphical user interface such as, preferably, Microsoft Windows95 (not shown). Also illustrated in FIG. 2 and forming a part of computer system 10 are a mouse 8, a keyboard 22 and a CRT display screen 26 (hereinafter "CRT"), also readily available off-the-shelf computer items compatible with the computer 10.

It will of course be recognized that there are many art recognized alternatives to the above mentioned basic components. For instance, and as non-limiting examples of how the terms are used herein, the fixed disk drive 14 and CD-ROM 20 may be any means for storing high volumes of digital data, be it magnetic, optical, floptical or silicon based. The display screen may be any means for visibly displaying text and animation, whether a CRT screen, an active or passive LCD, a plasma display or any display where the output image is mapped as a series of dimensional coordinates. The display may be VGA, SVGA or better, with resolution from 640×480 or better. The CD-ROM drive may be double- or quad-speed or better, and the CPU may be an Intel Pentium processor or better.

Figure 3:
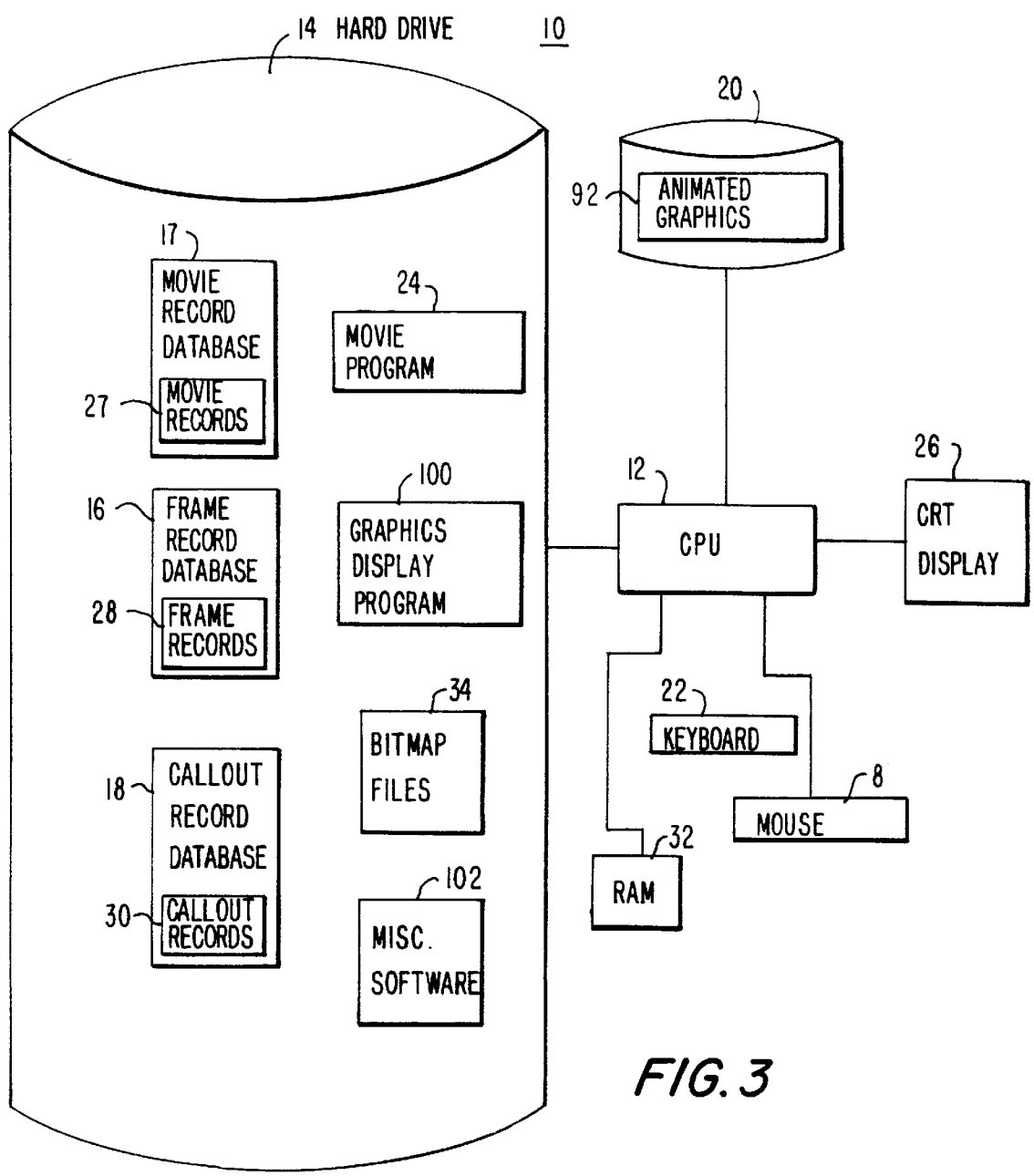
FIG. 3 is an additional diagrammatic representation of the computer system of FIG. 2, depicting in further detail a preferred storage scheme for creating and displaying computer animation.

The computer 10 further contains RAM 32 wherein application programs to be executed by the CPU 12 are loaded and stored from the fixed disk drive 14 and/or the CD-ROM 20. The CPU may also execute instructions from internal ROM (not shown). As seen in FIG. 3, stored on the hard drive 14 are various user selected application software programs 102, as well as a graphics display program 100 for the playing of graphic animation movies, such as, for example, the WinToon program from MICROSOFT® and MICROSOFT® Video for WINDOWS(™). Also stored on hard disk 14 is a movie program 24 for creating and displaying movies in accordance with the instant invention, as well as a frame record database 16 containing frame records 28, a movie record database 17 containing movie records 27, and a callout record database 18 containing callout records 30. The three databases are in communication with, and used by, movie program 24, all of which are discussed in greater detail below. It should be noted that the terms "database" and "table" are used interchangeably herein and are meant to refer to collections of data used alone and in conjunction with other data by the invention. While a database typically implies a relational interaction among various data tables and a table usually refers to a collection of data within a database, persons skilled in the art will readily recognize that use of these terms is flexible and depends, in part, on the structure of the data stored within, and used from, these sources. The movie program 24 may be written in any high level programming language suited to the task, such as C or Basic, using such art recognized tools as MICROSOFT Visual C++, Visual Basic, or their art recognized equivalents. The databases may be created using any database program and supported by known programming productivity tools, such as, for example MICROSOFT Access, MICROSOFT ODBC (Open Data Base Connectivity) and MICROSOFT Access Desktop Driver. Also utilized may be the MIRCOSOFT Win 32 SDK (Software Development Kit) which contains the generic WINDOWS API support files required for writing Windows-based applications. In addition, MICROSOFT "toonscan.exe" is used after creation of the computer animation to determine which portions of the animation have been changed from frame-to-frame, i.e. which portions need to be redrawn as the animation plays. In creating animation for use with the instant invention, such art recognized animation tools as Autodesk ANIMATOR PRO (™), COREL DRAW®, Video for Windows, ADOBE PRE- MIERE (™), and/or CameraMan may be used, as well as their art recognized equivalents. The following examples highlight the functional capabilities of the instant invention.

Functional Examples:

With reference to FIGS. 5a through 5d, there is depicted a movie entitled "Movie A" running in an animation window 120 sized to encompass a leftward pointing arrow.

The exemplary animation for "Movie A" encompasses four frames, labelled frame 1 through frame 4 and depicted in FIGS. 5a through 5d respectively. In accordance with the instant invention, the size of window 120 need only be as large as the range of motion required by the animation therein, in this case the leftward pointing arrow. Thus, for example, rather than animating the arrow as a portion of an entire 640×480 screen, the arrow could be animated in a 200×300 window or smaller, as required. It will be recognized that the CD-ROM storage requirements for such a scaled down animation are thus greatly reduced. The benefits of this are manifest.

Figure 6:
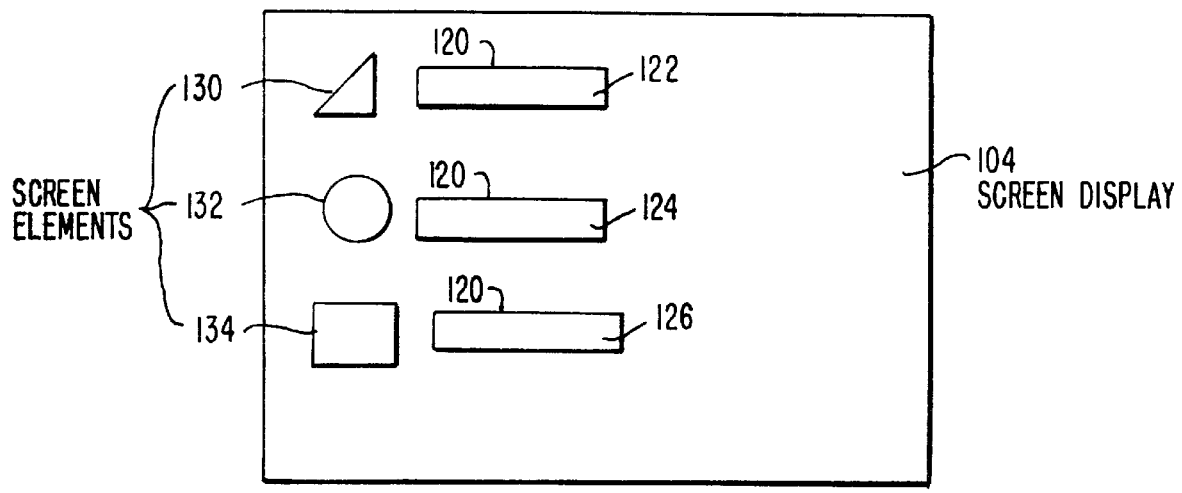
FIG. 6 depicts an exemplary screen showing the anchoring of the playing of a movie to a screen element in accordance with the instant invention.

Continuing with the example, and with reference to FIG. 6, there are shown three screen elements 130, 132, and 134 located in various positions on a screen display 104. These screen elements may be, for example, WINDOWS95 (™) screen icons, discrete portions of or images in the background bitmap, window borders, or any other portion of the display screen whose absolute position on the display can be determined down to the pixel level. Assume that an animator requires that a leftward pointing arrow such as that drawn in "Movie A" be overlaid on screen 104 and directed at each screen element in sequence from top to bottom in positions 122, 124 and 126 respectively. Utilizing prior art methods, an animator would create an entire 640×480 screen re-creating the screen elements themselves, and then animate three leftward pointing arrows in each of the three desired positions, all as part of one long animated segment, consuming significant storage space on a CD-ROM.

In accordance with the present invention, the animator need only identify the location of the screen elements of interest and where the "Movie A" overlay animation window should be located relative to each of those screen elements. This is done by using the inventive method to create a frame record, discussed in greater detail below. During playback of the movie, the frame record data is utilized by movie program 24 which calls "Movie A" to play three times in succession, first in location 122, then in location 124, and finally in location 126. The movie program 24 uses the pre-existing screen elements 130, 132 and 134 as "anchors," and plays "Movie A" in a fixed offset position relative to those "anchors." The storage requirements on the CD-ROM are no greater than that required to contain the four frames of "Movie A" as described above and depicted in FIGS. 5a through 5d. Additionally, should the underlying location of the screen elements change, the movie, and of course the CD-ROM, need not be modified. Since the inventive application anchors the playing of the desired movie to the absolute location of each screen element, the movie playback will be correctly positioned regardless of where that screen element is actually located on the display. This renders the graphics usable at any resolution.

Figure 7A:
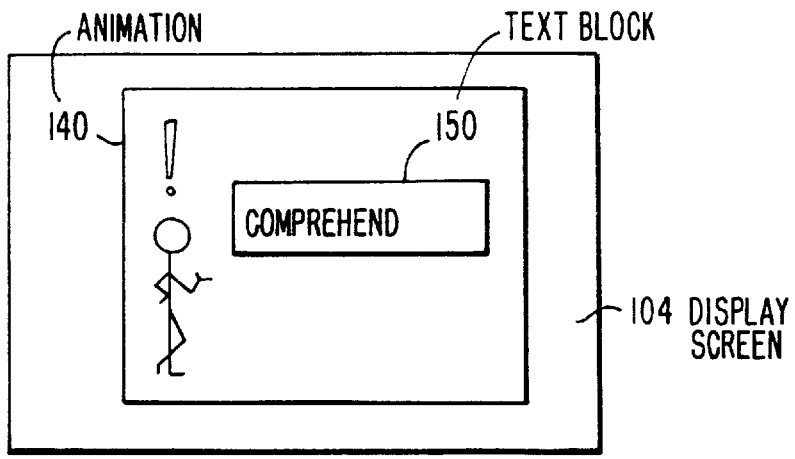
FIGS. 7a through 7c depict exemplary changes to text displayed in connection with a movie made possible by utilizing the teachings of the instant invention.
Figure 7B:
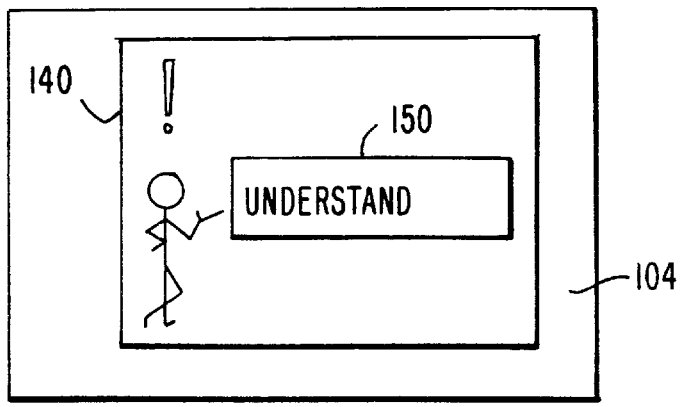

Continuing with the example, and in connection with text incorporated as part of a movie, reference is made to FIG. 7a. In that figure a display screen 104 is depicted, upon which an animation 140 with an associated text block 150 are shown. Using prior art techniques, the text 150 and animation 140 would be inseparably linked together as part as one animated movie file. If the movie required a text change, such as the change shown in FIG. 7b, the movie segment would need to be re-animated using the changed text, and a new CD-ROM would need to be created as well.

Figure 7C:
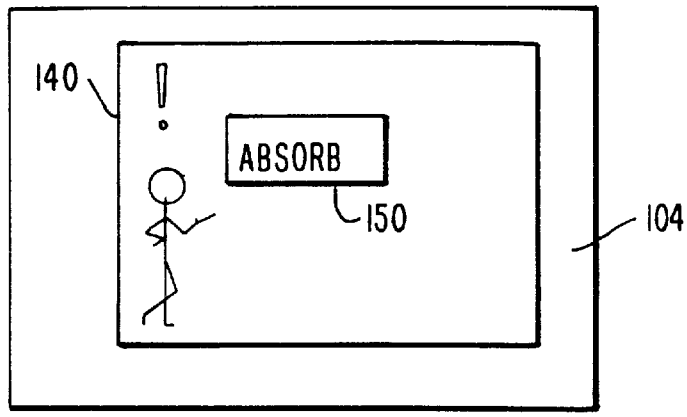

Utilizing the instant invention, and referring once again to FIG. 3, when the animator determines there is a need for text as part of a movie, the animator uses the instant invention to create a callout record 30 in a callout record database 18. The callout record 30 contains the text and its attributes (point size, font, etc.), as well as information regarding its display position. The callout records 30 are preferably, but not necessarily, stored on hard drive 14, but in any case are independent of the animation 140 which is stored in an animated graphics file 92 on CD-ROM 20. Thus, if subsequent to the creation of CD-ROM 20 containing animation 140 the associated text 150 needs to be changed, the animator need only change the text and/or its attributes stored on drive 14 in callout record 30. Accordingly, the exemplary text changes shown occurring between FIGS. 7a and 7b, and between FIGS. 7b to 7c, can all be readily achieved without any need to modify animation 140 or CD-ROM 20.

Movie Creation:

Generally, the movie authoring process begins in much the same manner as if the author was going to include screen elements and text directly in the movie, as presently known. A script is written, dialogue is recorded, storyboards are used to lay out the animation, and decisions are made about where to place screen elements and text in the movie. As used herein, the terms author, animator, and/or programmer are used synonymously, and are meant to apply to the person or persons using the inventive method and system to create and play movies, even though the individual tasks described herein may be performed by different persons.

The author creates an animation sequence using various art-recognized tools, such as those described above in the "Movie A" example, but does not include either the screen elements or the text directly in the movie. Also, rather than composing animations in the correct location for a 640×480 screen, and an 800×600 screen, and so on, the animator will instead create animations that appear within as small a window as possible, since the movie program 24 will place the animation in the proper screen location as required. The animation frames may be sized to fit into a window of the same size as the animation frames, or the window may be larger than the animation frames, as a matter of choice.

When the animation sequence is complete it is assigned a WINDOWS filename, such as for example "sample.avi", and the author then utilizes the inventive method to create a movie record 27 containing pertinent information about the movie in movie record database 17. The animator then utilizes the inventive method to create entries in the frame record and callout record databases 16 and 18, where anchoring and text callout information associated with that animation file is stored.

Figure 4:
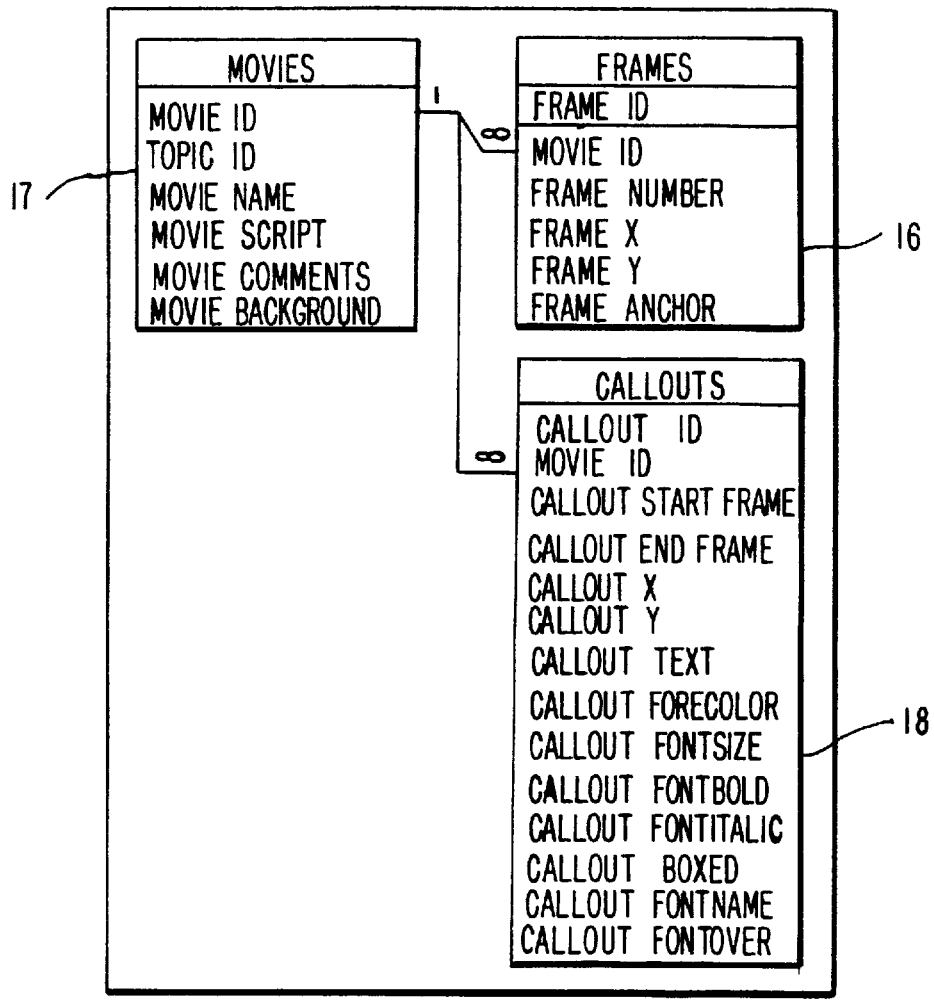
FIG. 4 is a representation of the relationship between the major databases utilized in the practice of the instant invention.
Figure 5A:
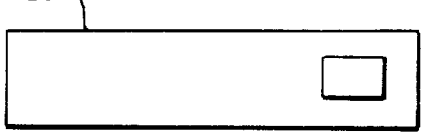
FIGS. 5a through 5d depict one frame of a four frame animated movie of a type utilized in the practice of the instant invention.
Figure 5B:
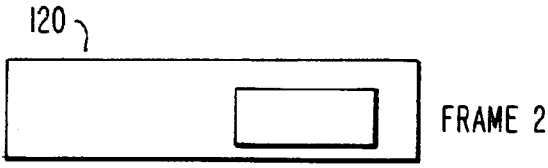
Figure 5C:
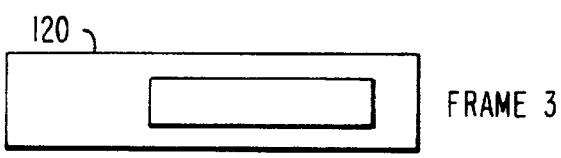
Figure 5D:
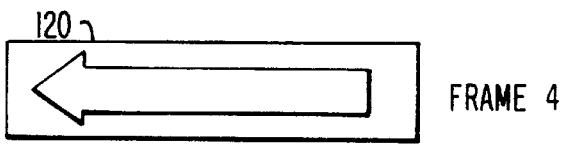

As seen in FIG. 4, a representative relationship between the entries in the databases 16, 17 and 18 forming parts of the inventive method is shown. Each box in FIG. 4 represents a table in a respective database. There is a one-to-many relationship between movies and frames, and between movies and callouts, i.e. for each single movie record 27, there can be any number of frame records 28 and/or callout records 30.

FIG. 8 depicts the data contained in exemplary movie records 27 contained in movie record database 17. The Movie ID is the identifier for the movie associated with that movie record. The Topic ID field in the movie table refers back to other parts of the database that are not relevant to the invention, being present solely for the convenience of the author. The Movie Name field is the external filename of the movie itself, e.g. "sample.avi."

The Movie Background field is used to name an external bitmap file 34 containing an optional background bitmap for a movie, e.g. "dsktop01.bmp." If supplied, the movie is generally, although not necessarily, displayed in a centered box overlaid on top of the supplied bitmap, and any frame records are ignored. If no external bitmap file is supplied, the movie program 24 captures the current screen and uses that as the background bitmap over which movies will be played.

FIG. 4 also depicts a Movie Script field used to store the text of the audio track, and a Movie Comments field which can be used for whatever the author wishes; neither are used by the invention. These fields are for author convenience only. The contents of frame and callout records are further discussed below.

Frame Records:

Where a movie needs to be played relative to a pre-existing screen element, such as, for example, a movie overlaid on a WINDOWS95 screen adjacent the "Start Button" screen icon, the author creates a frame record 28 in which the movie ID, frame number, anchor and x and y axis pixel offsets from the anchor are specified. Exemplary frame record data is depicted in FIG. 9.

The Frame ID is the frame record identifier. The Movie ID links the frame record to a particular movie. The Frame Number refers to the number of the individual animation frame of the movie at which the desired activity associated with that frame record occurs. The Frame Anchor is a name used to refer to the screen element relative to which a selected movie should be played, such as element 130 relative to which movie 120 was played in the above-described example depicted in FIG. 6. When the movie being played under the control of movie program 24 reaches the indicated Frame Number, its upper-left corner is positioned relative to the anchor by the given Frame x and Frame y pixel offsets. The x and y offsets indicate the screen position where the movie will play, relative to the identified Frame Anchor. The author preferably uses an x, y pixel coordinate convention where the top left screen pixel is equal to 0,0, with x,y values increasing as one moves down and to the right on the screen. The x and y offsets stored in each frame record are typically made relative to the upper-left corner of the anchor, although other locations on the anchor may be selected.

There are, however, special cases: the "Center" anchor used by the system is the pixel location where the movie would be centered on the screen. The "Taskbar" anchor used by the system is the pixel location where the movie is centered horizontally, because the taskbar width varies with the screen width.

In creating a frame record it is not necessary to specify an end frame number, since the movie will remain in that position until the next frame record or until the end of the movie is reached.

Callout Records:

If the movie created contains associated text, the author next creates callout records 30 in callout record database 18. Exemplary callout record data is depicted in FIG. 10. The Callout ID is the identifier for a particular callout record 30 contained in callout record database 18. The Movie ID identifies the particular movie with which each callout record 30 is associated. Each callout record 30 contains Callout Text, which identifies the text to be displayed. The Callout Start Frame identifies the frame number of the movie at which the callout text is displayed on the screen by movie program 24. The Callout End Frame identifies the frame number of the movie at which the callout text is removed from the screen by movie program 24.

The Callout x and Callout y entries represent pixel coordinates specifying where the top-left corner of the text will appear. The pixel coordinates may be absolute or may represent an offset position relative to a screen element or a movie. In a preferred embodiment the pixel coordinates represent an offset position relative to the top left corner of the movie. However, when text is to be keyed to a movie position, it is generally keyed to the position of the upper left corner of the movie after the movie has been positioned in accordance with the x,y pixel offset data contained in a frame record. At that point the top left pixel of the movie is treated as the point where x=0 and y=0. Additionally, a negative value for x or y indicates that the movie should be centered along the corresponding axis. Otherwise, text is positioned using these pixel coordinates in much the same manner as that described above in connection with a frame record.

In the preferred embodiment, text retrieved in connection with callouts appears only within the movie frame.

The Callout ForeColor entry is used to identify the color of the text as it appears on the screen. The Callout Font Size entry indicates the point size of the displayed text. The Callout Font Bold and Callout Font Italic entries identify whether the text appears on the screen in bold or italic typeface, depending on whether each respective entry is made true or false as desired.

The Callout Boxed entry is used to identify whether the text should appear in a contrasting box when displayed on the screen, so as to render it more readable when overlaid upon mottled backgrounds. If the author desires a box, a "true" entry is made in the callout record.

The Callout Font Name entry indicates the font in which the text is to appear, e.g. Courier, Roman, Times, Arial etc.

Text can be placed either between the background bitmap and the animation, i.e. under the animation, or on top of the animation, i.e. over it. This is dictated by whether the Callout Font Over entry in the record is true or false.

Of course, it will be recognized that other text attributes may be included depending on the requirements of the particular application to which the movie program is applied. The text itself may contain carriage returns to indicate line breaks, so that a single callout may consist of multiple lines of text if the author desires.

Unlike frame records, callout records must specify both start and end frame numbers. This is necessary because many callouts can appear simultaneously. The start and end frame numbers determine the lifetime of an individual callout, independent of any other callouts that may be present.

Modification Subsequent To Creation:

Now that the original movie is complete, it is relatively simple to change its location relative to new or different anchors by simply changing the frame record data accordingly.

The text may also be easily modified in content or appearance, or translated to other languages, making the invention an extremely valuable tool for developing applications for the international marketplace. Assuming that some care is taken to ensure an audio track of the same length as the original, there is no need to change the visual part of the movie at all. The frame records and anchoring are unaffected, and only the text portion of the callout records needs to be changed. In some cases the x and y position and/or the font size of the callout may need some tuning if the text length is substantially different.

Playing Movies:

Referring now to FIG. 3, the user invokes certain well known stored instructions to direct the computer 10 to run movie program 24, which includes routines comprised of instructions that implement the steps of the method of the invention.

In operation, the movie program 24 uses movie records 27 in combination with frame records 28, callout records 30, and animated graphics file 92 such as, for example an animated graphics file with a ".avi" suffix, to display an integrated movie which, to the viewer, may appear no different than movies created using current techniques. The movie program 24 retrieves movie record data 27, frame record data 28 and callout record data 30 from the fixed disk drive 14, while the animated graphics 92 is retrieved from the CD-ROM 20. Although the preferred embodiment comprises storing the text on a fixed disk drive 14 and the animated graphics 92 on a CD-ROM 20, they could if desired be stored on the same memory storage means or other art recognized storage devices, as a matter of design choice.

While displaying a movie, the movie program 24 dynamically positions the animation window depending on the positioning data contained within the frame record database 16 and dynamically displays text depending on the data contained in callout record database 18.

Referring now to FIG. 11, a flowchart further illustrates the method of operation of the invention, the flowchart being generally designated 40. Beginning at step 50, the movie program 24 invokes the graphics display program 100 to display the animated graphics 92 of the desired movie. Since the movie program 24 allows a movie to be displayed either on top of the current screen display, e.g. the WINDOWS Desktop, which can be converted to a bitmap, or on previously created and stored bitmaps, step 52 determines which background will be used for each movie.

If the movie is to be displayed on top of the current screen display, step 54 causes that screen to be copied into a background bitmap memory (not shown) in accordance with known techniques. Step 56 then loads the frame record data 28 for this movie from the frame record database 16 into RAM 32. Also at step 56, the program converts the x,y positioning information in the frame record 28 so as to align the upper left corner of the animation window with the actual screen position of the upper left corner of the corresponding anchor. This conversion is accomplished by the movie program 24 first obtaining the x, y pixel location of the upper left corner of the anchor to which the frame record data 28 corresponds, and adjusting the movie window coordinate positions from the relative x, y offset positions contained in the frame record to absolute x, y pixel locations on the screen.

The location of the upper left corner of a given screen element is obtained in different ways for different screen elements, and is largely a matter of design choice depending on the type of screen elements of concern to the particular author writing a particular movie program.

In a preferred embodiment, the location of each anchor is obtained using special-purpose application code specific to each "family" of anchors. A "family" consists of a set of anchors whose locations are obtained in a similar manner. For example, the "My Computer" and "Recycle Bin" desktop icons used in Windows95 are found using the same technique, and so are members of the same "family."

Thus the means for identifying the display location of a particular screen element is a software application or routine running in the computer. For example to find a WINDOWS desktop icon several steps are required. First the application code must determine the label attached to the icon. This is necessary for two reasons: (i) the user can rename the items, e.g. "My Computer" could be renamed to "Fred's PC"; and (ii) foreign language versions of WINDOWS95 will have translated names by default, e.g. the French version of WINDOWS95 might have "Mon Ordinateur" instead of "My Computer".

To determine the name, the SHGetSpecialFolderLocation API function is used, passing the special folder id, e.g. CSIDL_DRIVES for My Computer. This returns a long binary identifier. Then the SHGetDesktopFolder and IShellFolder::GetDisplayNameOf API functions are used to convert this to the human-readable name that is used as the label for the item.

Second, since the icons are displayed on a type of window called a "ListView Control" —which is a standard WINDOWS95 interface—the particular listview of interest must be found by searching in an iterative fashion for windows with specific names and class names. One does this by using the FindWindow and FindWindowEx API functions.

In this example, a window named "Program Manager" with a class name of "Progman" is located first. Then its child windows are searched for a class named "SHELLDLL_DefView". Finally, that window's children are searched for a WC_LISTVIEW class window.

Third, although there are standard interface functions for obtaining information about the icons in a listview, they were never intended to be used outside the owner application, i.e. the WINDOWS95 shell. In order to use those interfaces from a foreign application such as the movie program 24, shared memory must be allocated and used, since most memory is private to one particular application and cannot be read or written to by another application.

Fourth, the listview interface functions are used to search for an icon with a label matching the name determined in the first step described above.

Fifth, once found, a final listview interface function is called to obtain the location of the icon on the screen in pixel units.

Finding other anchors which are not desktop icons requires special code for each case. Most are somewhat less involved. For example, to locate the WINDOWS95 "Taskbar," it is only necessary to search for a window with a class name of "Shell_TrayWnd" using the FindWindow API function.

One skilled in the art will no doubt recognize alternative ways to identify the pixel unit location of screen elements using other art recognized techniques suited to that purpose.

Continuing with step 56, by way of example, if the application locates a screen element with an upper left corner located at x=10, y=10, and the offset value in the associated frame record is x=50, y=50, the movie would be positioned and played with its upper left corner at x=60 pixels and y=60 pixels from the top left corner of the screen, (that being the point where x=0 and y=0). Having successfully determined the position of the window in which the movie will be played, step 56 concludes.

Continuing along flowchart 40 to step 58, if the computer animation is to be displayed on top of a pre-existing, stored background bitmap, a pre-existing background bitmap file 34 is copied into the background bitmap memory. Pre-existing bitmaps may be stored on hard drive 14, on CD-ROM 20, or any of the other storage devices mentioned herein. When a pre-existing bitmap is used, frame record data 28 may be ignored and the movie centered on the CRT 26, or frame record data 28 may be utilized to position the movie on the bitmap as described above.

In step 60, the movie program 24 next loads all callout record data 30 from the callout record database 18 into RAM 32. For more efficient playback of the movie, the text attributes contained in each callout record 30 are converted into a font object that represents the attributes of the text as contained in the callout record 30. In step 62 the background bitmap previously stored in bitmap memory is displayed on the CRT 26. In step 64, the initiation of the playing of the first movie frame to be displayed on the CRT 26 is begun.

In step 66, the movie program 24 utilizes the now RAM-resident frame record data to determine whether the animation window should be moved before displaying the current frame on the CRT 26. If the animation window is to be repositioned, the animation window is relocated according to the x,y coordinate data obtained in the conversion carried out in step 56. Parts of the bitmap which need to be redrawn as a result of the move are retrieved from the bitmap memory and then redrawn, to maintain continuity of the background.

Steps 68 and 72 examine the data in a callout record 30 to determine if text in a callout record 30 will be displayed over or under the animation. The text is drawn on the screen in step 68, in accordance with the appropriate callout record data, only if the text is to be displayed under the animated graphics 92.

Step 72 draws the text in accordance with the appropriate callout record data when the text is to be displayed over the animation frame drawn in step 70. For both steps 68 and 72, the text is displayed on the screen under the control of movie program 24, a function that is independent of graphics display program 100.

In step 70 the program 24 causes the current animation frame to be drawn, that is it causes it to be displayed on the CRT 26 by graphics display program 100.

In step 74, the movie program 24 determines if the last animation frame has been played. If the last animation frame has not been played, step 76 initiates the display of the next animation frame. The movie program 24 then returns to step 66 and repeats the steps described above. If the last animation frame has played, the movie program 24 terminates operation at step 78.

Of course it will be recognized that there may not be frame record data required for every movie, nor is it required that there be callout record data for every movie. Either or both may be selectively used for a movie, as desired by the author. the x, y pixel locations may be designated relative to any desired location on the screen, such as, for example, the lower left screen pixel being the point where x and y equal zero.

It should also be understood that the preferred embodiments and examples described are for illustrative purposes only and are not to be construed as limiting the scope of the present invention, which is properly delineated only in the appended claims.

what is claimed is:

1. A method of displaying a movie for viewing by a viewer in a frameless animation window on a computer display operatively displaying a bitmap, the movie comprising a predetermined number of sequentially-displayed movie frames defining a movie duration, the animation window having a size and a boundary smaller than the boundary of the computer display and being selectively movable about the computer display for placement and display at various locations on the computer display in such a manner that the viewer is substantially unable to distinguish the animation window boundary as the movie is displayed in each of a sequential plurality of locations on the computer display during the movie duration, the selective movement of the animation window presenting an appearance to the viewer that the movie is substantially equal in size and shape to the computer display boundary, said method comprising the steps of:

(a) identifying a screen element on the computer display relative to which the movie is to be displayed for a predetermined duration, wherein said screen element may be selectively moved on the computer display by the viewer;

(b) determining a location on the computer display relative to the identified screen element at which the movie is to be displayed for said predetermined duration;

(c) capturing a selected portion of the bitmap displayed on the computer display for placement within the animation window;

(d) opening the animation window at said determined movie display location and displaying said captured portion as the background within the animation window so as to render the location and boundary of the animation window substantially undetectable to the viewer;

(e) displaying the movie in the animation window for said predetermined duration;

(f) determining, as the movie is displayed in the animation window, whether the movie duration has elapsed;

(g) identifying, if said step (f) has determined that the movie duration has not elapsed, a next screen element on the computer display and repeating steps (b) through (g).

2. The method of claim 1, wherein said step (b) further comprises determining a pixel location at a top left corner of the identified screen element.

3. The method of claim 2, wherein said step (d) further comprises positioning a top left corner of the animation window relative to said determined pixel location at the top left corner of the identified screen element.

4. The method of claim 1, wherein said predetermined duration is less than the movie duration.

5. The method of claim 1, wherein said predetermined duration is approximately equal to the movie duration.

6. The method of claim 1, wherein the movie comprises an animated portion and a non-animated portion.

7. The method of claim 6, wherein said animated portion of the movie is stored on a first digital storage device and wherein said non-animated portion of the movie is stored separate from the animated portion on a second digital storage device.

8. The method of claim 6, further comprising the step of selectively displaying said non-animated portion of the movie at a preselected location on the computer display for a predetermined period during display of the movie.

9. The method of claim 8, wherein said preselected location is within the animation window.

10. The method of claim 8, wherein said predetermined period is less than the movie duration.

11. The method of claim 6, wherein said animated portion has a size substantially equal to the animation window size.

12. A computer system having a computer display for displaying a movie in a frameless animation window for viewing by a viewer, the computer display operatively displaying a bitmap, the movie comprising a predetermined number of sequentially-displayed movie frames defining a movie duration, the animation window having a size and a boundary smaller than a boundary of the computer display and being selectively movable about the computer display for placement and display at various locations on the computer display in such a manner that the viewer is substantially unable to distinguish the animation window boundary as the movie is displayed in each of a sequential plurality of locations on the computer display during the movie duration, the selective movement of the animation window presenting an appearance to the viewer that the movie is substantially equal in size and shaped to the computer display boundary, said computer system comprising:

> means for identifying a screen element on the computer display relative to which the movie is to be displayed for a predetermined duration, wherein said screen element may be selectively moved on the computer display by the viewer;
>
> means for determining a location on the computer display relative to the identified screen element at which the movie is to be displayed for said predetermined duration;
>
> means for capturing a selected portion of the bitmap displayed on the computer display for placement within the animation window;
>
> means for opening the animation window at said determined movie display location and for displaying said captured portion as the background within the animation window so as to render the location and boundary of the animation window substantially undetectable to the viewer:
>
> means for displaying the movie in the animation window for said predetermined duration;
>
> means for determining, as the movie is displayed in the animation window, whether the movie duration has elapsed;
>
> means for identifying, if the movie duration has nut elapsed, a next screen element on the computer display; and
>
> means for repositioning the animation window on the computer display based on the location of the next identified screen element.

13. The computer system of claim 12, wherein the movie comprises an animated portion and a non-animated portion, said computer system further comprising:

> a first digital storage device for storing said animated portion of the movie; and
>
> a second digital storage device for storing said non-animated portion of the movie separate and independent from said animated portion.

14. The computer system of claim 13, wherein said first digital storage device comprises a CD-ROM and said second digital storage device comprises a hard disk unit.

15. The computer system of claim 12, further comprising means for selectively displaying said non-animated portion of the movie at a preselected location on the computer display for a predetermined period during display of the movie.

16. The computer system of claim 15, wherein said preselected location is within the animation window.

17. The computer system of claim 15, wherein said predetermined period is less than the movie duration.

* * * * *